United States Patent
Myrick

(10) Patent No.: US 6,929,865 B2
(45) Date of Patent: Aug. 16, 2005

(54) STEEL REINFORCED CONCRETE SYSTEMS

(76) Inventor: James J. Myrick, 748 Greenwood Ave., Glencoe, IL (US) 60022

( * ) Notice: Subject to any disclaimer, the term of this patent is extended or adjusted under 35 U.S.C. 154(b) by 38 days.

(21) Appl. No.: 10/125,969

(22) Filed: Apr. 19, 2002

(65) Prior Publication Data

US 2002/0177003 A1 Nov. 28, 2002

Related U.S. Application Data

(60) Provisional application No. 60/292,669, filed on May 22, 2001, provisional application No. 60/292,220, filed on May 18, 2001, and provisional application No. 60/286,449, filed on Apr. 25, 2001.

(51) Int. Cl.$^7$ .............................................. B32B 15/04
(52) U.S. Cl. ........................ 428/469; 428/703; 106/644
(58) Field of Search ................................ 428/469, 703; 106/644

(56) References Cited

U.S. PATENT DOCUMENTS

| | | | | |
|---|---|---|---|---|
| 4,090,883 A | * | 5/1978 | Rauschenfels | ................ 106/99 |
| 4,255,495 A | * | 3/1981 | Levine et al. | ................ 428/471 |
| 4,861,375 A | * | 8/1989 | Nakano et al. | ................ 106/90 |
| 5,100,738 A | * | 3/1992 | Graf | ........................... 428/613 |
| 5,427,819 A | * | 6/1995 | Weyers et al. | ................ 427/136 |
| 6,194,084 B1 | * | 2/2001 | Wei et al. | .................... 428/615 |

FOREIGN PATENT DOCUMENTS

WO    WO 01/31136    *  3/2001    ........... B32B/15/04

* cited by examiner

*Primary Examiner*—Deborah Jones
*Assistant Examiner*—Vivek Koppikar

(57) ABSTRACT

Noncorroding reinforcing steel, and steel reinforced concrete, which has an adherent bond with hydrated concrete formed by a thermally sprayed hydraulically reactive layer of a material such as blast furnace slag on the steel surface.

4 Claims, 10 Drawing Sheets

Figure 9 – GGBFS Directly on Steel Rebar
Figure 10 – GGBFS on Silicon on Steel Rebar Dense, adherent, continuous, pure metal layer 3-20 microns thick Codeposition layer of dense, adherent electrodeposited metal 3-15 microns thick, codeposited with silicon and/or silicious particles which are reactive with cement paste to form dense calcium silicate layer.

STEEL REINFORCED CONCRETE SYSTEMS

CROSS-REFERENCES TO RELATED APPLICATIONS

This application claims priority from U.S. provisional application 60/292,669 filed May 22, 2001 and U.S. provisional application 60/292,220 filed May 18, 2001 and U.S. provisional application 60/286,449 filed Apr. 25, 2001.

FIELD OF THE INVENTION

The present invention is directed to reinforced concrete systems, and more particularly, is directed to steel reinforced concrete having improved corrosion and/or mechanical performance.

BACKGROUND OF THE INVENTION

Steel-reinforced concrete is a remarkably versatile and ubiquitous material. It is easily formed from a cement-based slurry which hydrates with water, without extensive volume change, to form solid, compressively strong structures of virtually unlimited size and shape. The structural weakness of concrete in tension is compensated by relatively inexpensive steel reinforcement, which fortuitously approximates the thermal expansion of concrete over a broad temperature range. Unfortunately, steel reinforcement is subject to corrosion (rusting), even when embedded in the high-pH, passivating environment of the hydrated cement paste. The pressure from the increased volume of the confined iron oxide corrosion product spalls and cracks the concrete, destroying its functional integrity long before the end of its potential design life. Estimates of the repair cost for existing highway bridges in the U.S. have been put at over $50 billion, and $1 to $3 trillion for all concrete structures M. Fickleburn, "Editorial", *Materials and Structures Journal*, RILEM, Vol. 23, No. 137, p. 317(1990).

Except for its tendency to corrode, and its poor mechanical interface with the cement matrix, steel-reinforced concrete has many desirable attributes which have made it a dominant "Infrastructure" material for roads, bridges, buildings and dams throughout the world. An enormous design, manufacturing and construction industry has developed which is efficient and skilled in its use and application. In the absence of corrosion, its behavior is relatively predictable and reliable. Conventional steel reinforcement is relatively inexpensive, particularly in comparison to inherently expensive alternatives such as Fiber Reinforced Plastic (FRP) and stainless steel.

Corrosion of steel reinforcement is greatly accelerated in the presence of chloride ions, which catalyze iron oxidation. Even if not present in the original concrete, chlorides can penetrate throughout the pore structure of the concrete when the external surfaces of the concrete are exposed to deicing salts or marine environments [J. A. Gonzalez, et al., "Some Considerations On The Effect Of Chloride Ions On The Corrosion Of Steel Reinforcements Embedded In Concrete Structures", Magazine Of Concrete Research, Vol. 50, pp. 189–199 (1998)].

A wide variety of approaches has been attempted to overcome the problem of corrosion in reinforced concrete. For example, steel reinforcement with a relatively expensive epoxy coating is commonly used in bridges and highways. However, the soft epoxy coating is easily damaged during transportation and placement. The epoxy coating also prevents bonding of the rebar with the cement matrix, and itself tends to debond from the steel surface because its bond can be thermodynamically unstable in the alkaline cement environment. When debonded from the steel surface, the epoxy layer may be associated with underfilm and crevice corrosion. [Weyers, et al., "Estimating the Service Life of Epoxy-Coated Reinforcing Steel", *ACI Materials Journal*, pp. 546–557 (1998)].

Another expensive approach has been the use of reinforcing materials which do not corrode. Stainless steel reinforcing bars meeting appropriate specifications (ASTM A955 and BS 6744) have been used in selected applications [F. N. Smith, et al., "Stainless Steel Reinforcing Bars", Proc. Conf, Conference on Understanding Corrosion Mechanisms in Concrete, MIT, Cambridge, Mass., 27–31 Jul. 1997; F. N. Smith: "The Use Of Stainless Steel For Concrete Reinforcing Bars Is Gaining Momentum", *Stainless Steel World*, Vol. 10, No. 6, August 1998, p. 52], but unfortunately are relatively expensive and difficult to work with, and consume strategic materials. Fiber-reinforced plastic (FRP) reinforcing materials, which are even more expensive, are being developed as inert, corrosion-resistant reinforcement for concrete in marine and high-deicing-salt environments. [R. Masmoudi et. al., "Flexural Behavior of Concrete Beams Reinforced with Deformed Fiber Reinforced Plastic Reinforcing Rods", V. 95, pp. 665–676 (1998); Neale, K. W., and Labossiere, P., eds. Advanced Composite Materials in Bridges and Structures, Proceedings, First International Conference on Advanced Composite Materials in Bridges and Structures, Sherbrooke, Canada, published by the Canadian Society for Civil Engineering, 1992, 700 pp.; A. Nanni, et al., eds., Fiber Reinforced Plastic Reinforcement for Concrete Structures, SP-138, American Concrete Institute, Farmington Hills, Mich., 1993, 977 pp.; Saadatmanesh, H. and Ehsani, M. R., eds., Composites in Infrastructure, Proceedings, First International Conference on Composites in Infrastructures, Tucson, Ariz., 1996, 600 pp.]. FRP reinforcements typically comprise carbon, aramid and/or glass fibers embedded in a resin matrix, to provide a high tensile strength-to-weight ratio [O. Chaallal, et al., "Physical and Mechanical Performance of an Innovative Glass-Fiber Reinforced Plastic Rod for Concrete and Grouted Anchorages, "*Canadian Journal of Civil Engineering*, V. 20, No. 2,1993, pp. 254–268.]. However, in spite of their potentially high strength based on the strength of the individual fibers, radial force transmission among adjacent fibers may be poor, and failure in fiber reinforced plastic composites may occur at relatively low strains (about 1–3 percent). Their tendency for sudden, brittle failure, particularly at high strain rates, may present safety problems under current reinforced concrete design criteria [Banthia, et al., "Impact Resistance of Concrete Plates Reinforced with a Fiber Reinforced Plastic Grid", ACI *Materials Journal*, pp. 11–18 (1998)]. Unlike steel, FRP reinforcement also has a significantly higher radial thermal expansion than concrete, posing compatibility problems, and inherently poor adhesion to the cement matrix.

Because of the poor corrosion characteristics of steel reinforced concrete, there is significant opportunity to improve the overall properties of steel reinforced concrete, if improved interfaces can be provided [X. Fu, et al., "Effects Of Water-Cement Ratio, Curing Age, Silica Fume, Polymer Admixtures, Steel Surface Treatments, And Corrosion On Bond Between Concrete And Steel Reinforcing Bars", ACI Materials Journal, pp. 725–734 (1998)]. It is an object of the present invention to improve the mechanical properties and/or the durability, of steel reinforced concrete could be improved if the low density, highly porous interface zones adjacent the steel reinforcement surfaces could be replaced by dense, strong, adherent layers.

Accordingly, there is a need for improved concrete reinforcement, as well as functional cement-steel interfaces, which prevent corrosion of the steel reinforcement and resultant premature deterioration of steel reinforced concrete structures. There is also a need to improve anchoring and transmission of mechanical forces between the steel reinforcement and the cement matrix, in order to improve the performance and durability of the concrete. It would also be desirable to prevent percolation of corrosion-causing chloride salts along the surfaces of steel reinforcement in cured concrete structures.

There is also a need for functional interfaces which maximize underlying microstructure and hydration transformations in concrete, to optimize durability and macromechanical properties.

DESCRIPTION OF THE DRAWINGS

FIG. 9 is a photomicrograph of an undeformed steel reinforcing bar which has been plasma sprayed with an adherent integrally thermally bonded coating of blast furnace slag which is hydraulically reactive in a high-pH cement paste environment;

FIG. 10 is a photomicrograph of a steel reinforcing bar which has been plasma sprayed with an adherent silicon coating and an adherent, integral blast furnace slag coating which is hydraulically reactive in a high-pH cement paste environment;

SUMMARY OF THE INVENTION

Figure 1:
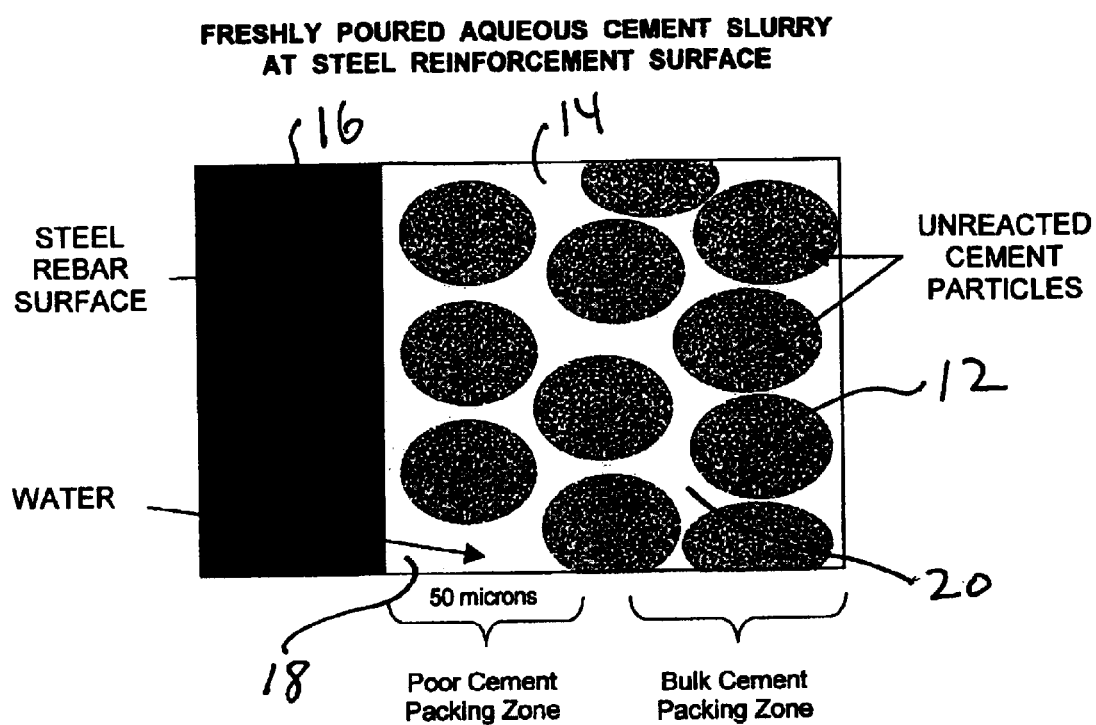
FIG. 1 is a schematic illustration of a conventional, freshly-poured, aqueous cement slurry at a steel reinforcement surface.

The present disclosure is directed to corrosion-prevention and property-enhancing technology for steel-reinforced concrete, to facilitate the continued use of conventional, relatively inexpensive carbon steel in highways, buildings, bridges and tunnels. Generally, the present invention is directed to steel reinforcement for concrete which has the capability of forming an adherent bond with a cement matrix, and/or to methods for providing functionally graded, strongly adherent interfaces between steel reinforcement and a bulk cement matrix. The present invention is also directed to corrosion-resistant steel reinforced concrete, and to methods for manufacturing corrosion-resistant concrete preferably having an interface between the bulk cement matrix and the steel reinforcement which is at least as strong as the cement paste of the bulk cement, and preferably stronger. The present invention is also directed to corrosion-resistant steel reinforcement. The interfaces may be provided in a suitable manner, such as by thermally spraying very thin, adherently bonded integrally functional layer(s) on the steel surface. Applying one or more thin, adherent layers of corrosion protective material, such as a nickel-containing non porous layer by electrolytic or electroless deposition may also be used to form protective metallic and composite layers on reinforcing steel. Similarly, vapor deposition, such as physical or chemical vapor deposition of silicon and its alloys on steel reinforcement can also be used to provide adherent protective layers on the reinforcing steel, as will be described in more detail. Preferably at least a portion of the layer will at least partially react with the hydrating cement to produce a dense, adherent interface with the cured concrete. Thermal spray application of a variety of functionally graduated interface materials on steel reinforcement bar surfaces may be utilized to more finely control the interface reaction in cement, as will be discussed in more detail. The purpose of the thermal spraying is to produce relatively dense, strongly adherent layers which are integrally and durably attached to, and protect, the steel surface. Various thermal spray systems such as plasma spray, HVOF (high velocity oxygen flame), and other combustion spray systems may be utilized. A key feature of the present disclosure is the thermal bonding of a calcium silicate or other cement-reactive layer to the steel surface, or corrosion-passivated steel surface, to provide a strongly adherent interface. Suitable reactive coating materials might also include thermally sprayed cohesive layers of alumina, calcium aluminate(s), calcium phosphate/apatite, ferrotitanates, and other materials which can react with hydraulic cement. Dicalcium silicate (e.g., from inexpensive pulverized fly ash or ground slag such as blast furnace slag, or pulverized burned oil shale) is a particularly preferred material, because of its relatively low cost and its ability to react in the high alkalinity environment of the cement mix, while being relatively inert under more neutral conditions of transport and storage. Similarly, base-activated calcium phosphates (such as apatite) and calcium aluminates may also be used.

In this regard, integrally adherent layers may be provided which are relatively inert and unreactive in storage and under construction site environmental conditions, but which are hydraulically reactive in the highly alkaline cement paste environment of an aqueous concrete mix. The thermally sprayed layers may also include strong fiber materials which strengthen the interface zone. The layers bond strongly with and protect the steel, and also may partially react with and become part of an enhanced, relatively dense interface with the bulk cement. It is important in the practicalities of the construction sites and construction practices that the thermally sprayed reinforcing steel can be made so it is relatively durable for transport and handling prior to use. It is relatively inexpensive to apply the coating(s) to the reinforcing steel, which is also an important consideration for providing commercially effective reinforcement products. In addition to thermally sprayed-cement reactive layers, other types of cement reactive layers may also be used. For example, silicone resins, which are polysiloxanes, tend to react over time at their Si—O—Si or Si—N—Si bonds in high pH environments. By providing a silicone resin with a reactive filler such as powdered blast furnace slag and/or powdered silicon, a coating may be provided which will be generally unreactive at neutral pH to protect the rebar, but which will be reactive in the high pH cement paste of the curing concrete. The siloxane (fragments released by hydrolysis reaction or the like can also be incorporated in the concrete composite, to participate in the formation of a dense layer which is relatively impervious to chloride ions. If suitable corrosion inhibiting materials such as aliphatic amines, are included in the reactive coating, they will be released locally to protect the steel during concrete curing. Depending upon the nature of the materials chosen to be applied to the steel reinforcement, an adhesion promotion layer may be selected to improve the adherence between the steel reinforcement surface and the thermally sprayed or other cement-reactive layer. Adhesion promoting materials include boron, silicon, chromium, titanium, nickel and their lower oxides, which can form a chemical bond with, or from within, the iron surface, and with a calcium silicate, aluminate and/or phosphate layer which may be thermally sprayed, electrolytically applied in a preferably cement-reactive binder, or vapor-deposited. The adhesion promotion layer may be very thin, for example, 10–2000 Angstroms, so that the amount of material applied can be very small in proportion to the mass of the steel reinforcement. An optional metallic corrosion-resistant layer, which is desirably integrally alloyed with or diffused in the steel reinforcement surface, may also be interposed between the steel and the cementitious hydraulically reactive bonding layer. This corrosion-resistant layer may also be relatively thin (e.g., 100 Angstroms to 100 microns, more preferably 1000 Angstroms to 25 microns) and comprise or be combined with the adhesion promoting layer. The corrosion-resistant layer may be, for example, an integral silicon, nickel, zirconium, cobalt, boron, titanium or chromium diffusion or alloy which resists chloride catalyzed oxidation of iron.

DETAILED DESCRIPTION OF THE INVENTION

As indicated, the present disclosure is directed to corrosion-prevention and property-enhancing technology for steel-reinforced concrete, to facilitate the continued use of conventional, relatively inexpensive carbon steel in highways, buildings, bridges and tunnels. Various aspects of the disclosure are directed to steel reinforcement for concrete which has the capability of forming an adherent bond with a cement matrix, and/or to methods for providing functionally graded, strongly adherent interfaces between steel reinforcement and a bulk cement matrix. The present disclosure is also directed to corrosion-resistant steel reinforced concrete, and to methods for manufacturing corrosion-resistant concrete having an interface between the bulk cement matrix and the steel reinforcement which is at least as strong as the cement paste of the bulk cement, and preferably stronger. The present invention is also directed to corrosion-resistant steel reinforcement. The interfaces may be provided by thermally spraying one or more very thin, functional layer(s) on the steel surface. The outer layer will at least partially react with the hydrating cement to produce a dense, adherent interface. Thermal spray application of a variety of functionally graduated interface materials on steel reinforcement bar surfaces may be utilized to more finely control the interface reaction in cement, as will be discussed in more detail. The purpose of the thermal spraying is to produce relatively dense, strongly adherent layers which are integrally and durably attached to, and protect, the steel surface. Various thermal spray systems such as plasma spray, HVOF (high velocity oxygen flame), and combustion spray systems may be utilized. A key feature of the present disclosure is the thermal bonding of a calcium silicate or other cement-reactive layer to the steel surface, to provide a strongly adherent interface. Suitable reactive coating materials might also include thermally sprayed cohesive layers of alumina, calcium aluminate(s), calcium phosphate/apatite, and other materials which can react with hydraulic cement. Dicalcium silicate (e.g., from inexpensive pulverized fuel ash or ground slag such as blast furnace slag, burned oil shale) is a particularly preferred material, because of its relatively low cost and its ability to react in the high alkalinity environment of the cement mix, while being relatively inert under more neutral conditions of transport and storage. In this regard, integrally adherent layers may be provided which are relatively inert and unreactive in storage and under potentially difficult construction site environmental conditions, but which are hydraulically reactive in the highly alkaline cement paste environment of an aqueous concrete mix. The layers bond strongly with and protect the steel, and also may partially react with and become part of an enhanced, relatively dense interface with the bulk cement. It is important in the practicalities of construction sites and construction practices that the thermally sprayed reinforcing steel can be made so it is relatively durable for transport and handling prior to use. It is relatively inexpensive to apply the coatings to the reinforcing steel, which is also an important consideration for providing commercially effective reinforcement products. An optional corrosion-resistant layer, which is desirably integrally alloyed with the steel reinforcement surface, may also be interposed between the steel and the cementitious hydraulically reactive bonding layer.

Methods for manufacturing steel reinforcement for concrete structures can comprise the steps of providing a steel reinforcement element for a concrete structure, thermally applying an adherent layer of hydraulically reactive alkaline earth oxide, aluminate, silicate or phosphate or silica to the external surface of the steel reinforcing element, to form a cohesive layer having a thickness of preferably from about 5 to about 500 microns. This layer is adherently bonded to the steel surface, either directly, or indirectly through an adherently bonded corrosion passivating layer such as a silicon or ferrosilicon layer.

Because concrete is a composite material, its physical, mechanical and chemical properties depend in part on the properties of the interfaces between the cement matrix and inclusions such as reinforcing steel, stone or sand aggregate and/or reinforcing fibers. These interfacial zones can be relatively porous compared to the bulk of the cement matrix, and may therefor be a "weak link" in reinforced concrete [Z. Li, et al., "Enhancement Of Re-Bar (Smooth Surface)-Concrete Bond Properties By Matrix Modification And Surface Coatings", *Magazine Of Concrete Research*, Vol. 50, p. 4957 (1998)]. The relatively porous interfacial zones typically can have a thickness of about 20–50 microns. A more complete discussion of the composite structure of concrete and the porous nature of the cement-aggregate interface, is given by E. J. Garboczi, et al., "Multi-Scale Picture of Concrete and its Transport Properties . . . ", *National Institute Of Standards and Technology NIST* 5900, pp. 1–46 (1996). The porous interfacial zones may be caused by surface effects from relatively inefficient packing of cement particles before the cement hardens. It has also been suggested that a "one-sided-growth" effect results from the hydrating reactant concentration coming only from the bulk cement side and not the inclusion surface [See Garboczi, et al., supra], to produce less dense, more porous, growth in the interfacial zone than in the bulk cement paste. The porosity of the "weak link" zone adjacent a steel reinforcing bar may actually increase during the curing of the cement, as interfacial void content or microcracking increase at the interface when the cement cures. X. Fu, et al., "Effects of Water-Cement Ratio, Curing Age, Silica Fume, Polymer Admixtures, Steel Surface Treatments, and Corrosion on Bond Between Concrete and Steel Reinforcing Bars", A CI *Materials Journal*, November–December, 1998, pp. 725–733. In this regard, schematically illustrated in FIG. 1 is a magnified view of a conventional, freshly-poured aqueous cement slurry at a steel reinforcement surface. The aqueous cement slurry comprises a plurality of unreacted cement particles 12 surrounded by water 14, which is adjacent the steel reinforcement surface 16. The unreacted cement particles are typically 20–60 microns in length, and accordingly are shown in schematically magnified view in FIG. 1. As shown in the figure, immediately adjacent the steel reinforcement surface 16, the cement particles may pack less efficiently than in the bulk cement packing zone. Accordingly, in freshly poured aqueous cement slurries there may be a relatively poor cement packing zone 18 immediately adjacent the steel reinforcement surface 16. In the bulk of the cement slurry (which may also contain other inclusions such as sand and gravel—not shown), the unreacted cement particles may pack relatively more efficiently and uniformly to provide a bulk cement packing zone 20.

A porous zone created upon hydration of the cement results in an undesirable gradient of physical properties. Because of this interfacial porosity, the mechanical properties at a conventional cement-steel interface may tend to be weakest where the strain is the highest. Cement paste/gel is inherently much weaker than the steel reinforcement, so its interface with the cement matrix is inherently a performance limiting zone, even if it is of uniform strength. Therefore, the formation of an even weaker zone with microporosity or microcracks immediately adjacent the steel reinforcement further exacerbates this "weak link", and further limits the performance of the concrete composite.

Figure 2:
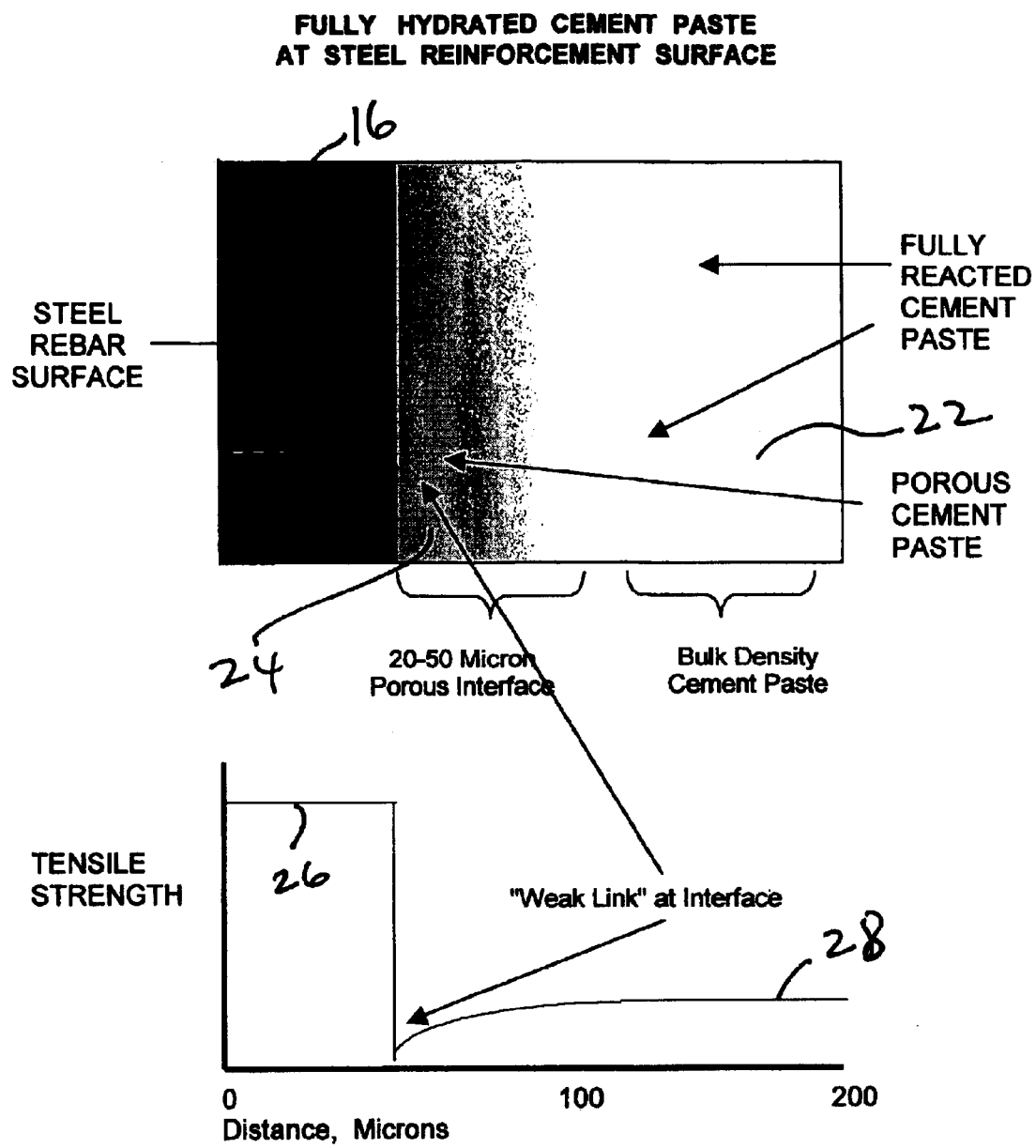
FIG. 2 is a schematic illustration of a conventional, fully-reacted cement paste, at the steel reinforcement surface of FIG. 1.

Schematically illustrated in FIG. 2 is a conventional fully-reacted cement paste at a steel reinforcement surface like that of FIG. 1. As shown in FIG. 2, the cement particles 12 of the bulk of the cement paste react with water to provide various hard, hydrated cement paste products to provide a bulk density cement paste zone 22. While the hydrated cement paste is not uniform at a microscopic level, in that it contains pores and may contain partially unreacted cement grains which are not fully hydrated at their cores, this cement paste zone is illustrated as a relatively dense, uniform zone in FIG. 1 for purposes of this discussion. While the fully reacted cement paste in the bulk density zone 22 may be relatively dense, the reacted cement paste immediately adjacent the steel reinforcement surface 16 has reduced density, for reasons previously discussed. The reduced density zone may be, for example, 20–50 microns in thickness and may form a relatively porous zone 24 immediately adjacent the steel reinforcement surface 16. As schematically shown immediately below the steel reinforcement and cement paste illustration of FIG. 2, and in registration and there with, is a graphical schematic illustration of the tensile strength of the materials present in the figure. As shown in FIG. 2, the tensile strength of the steel reinforcement is relatively high in comparison to the tensile strength 28 of the bulk density cement paste. In general, cement and concrete have a tensile strength which is significantly lower than its compressive strength, and significantly lower than that of the steel reinforcement. In fact, this is the principal reason for providing steel or other reinforcement in concrete. However, the tensile strength of the relatively porous interface between the bulk density cement paste and the steel reinforcement surface is even lower in tensile strength than the fully reacted bulk cement paste 22. This relatively weak, porous interface zone 24 is accordingly a "weak link" between the cured concrete mass and the steel reinforcement.

In addition, the porosity of the interface promotes corrosion by permitting contact with corrosion-inducing chloride ions and oxidizing agents, and adversely affects the environmental durability of the concrete, causing accelerated deterioration. In conventional concrete, the porous interface zones around each of the inclusions, including the steel reinforcement and the aggregate particles, form an interconnected network which can foster the percolation of chloride ions through the concrete cover to the steel reinforcement [Y. F. Houst, et al., "Influence of aggregate concentration on the diffusion of CO2 and O2", *Interfaces in Cementitious Composites*, ed. by J. Maso (E and FN Spon, London, 1992), 279–288]. When the porous interface zones interconnect as a result of the proximity of the aggregate surfaces present in conventional concretes, the concrete is "fully percolated" and can have up to two orders of magnitude greater permeability than the bulk cement paste from which it is made [J. F. Young, "A Review of the Pore Structure of Cement Paste and Concrete and Its Influence on Permeability", ill *Permeability of Concrete*, ed. by D. Whiting and A. Walitt, ACI SP-108 (American Concrete Institute, Detroit, 1988); C. L. Page and V. T. Ngala, in Proceedings of Conference on Chloride Diffusivity in Concrete, RILEM, France (1995), as well as reduced elastic modulus [R. W. Zimmerman, et al., Cem. Con. Res. 16, 239 (1986); A. Ulrik Nilsen and P. J. M. Monteiro, Concrete: A Three Phase Material, Cem. and Conc. Res. 23, 147–151 (1993); Cohen, et al., "The Role of Silica Fume in Mortar: Transition Zone Versus Bulk Paste Modification", *Cem. and Conc. Res.*, 24, 95–98 (1994)]. This "fully percolated porosity" of the interconnected interfacial zones permits more rapid transport of chloride ions through the concrete, as well as directly along the entire surface of the steel reinforcement, which can cause accelerated corrosion. The interfacial zone weakness and porosity adjacent the steel reinforcement can be exacerbated by inhomogeneities which occur during pouring of the reinforced concrete, such as caused by component settling in the concrete mix or structure before hardening. In this regard, relatively heavy aggregate and cement particles can settle in freshly poured concrete, to displace free water upwardly where it is trapped at the undersurfaces of aggregate and reinforcement [K. H. Khayat, "Use Of Viscosity-Modifying Admixture To Reduce Top Bar Effect Of Anchored Bars Cast With Fluid Concrete", *ACI Materials Journal*, pp. 158–167 (1998)]. This further increases interface porosity, and can even cause a separation between the lower surfaces of the reinforcement and the concrete [S. P. Shah, et al., "Modeling Of Constitutive Relationship Of Steel Fiber-Concrete Interface", *Mechanics Of Geomaterial Interfaces* (eds. A. P. S. Selvadurai, et at.) Elsevier, Amsterdam, pp. 227–255].

Figure 3:
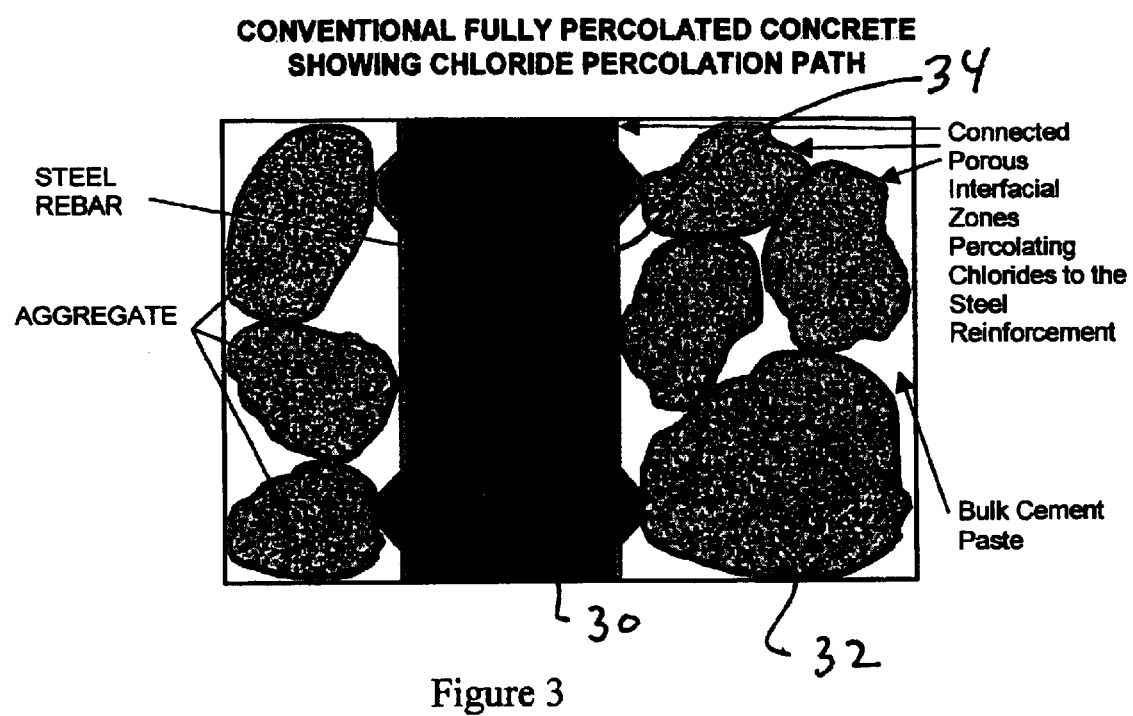
FIG. 3 is a schematic illustration of a fully percolated conventional concrete showing a chloride percolation path to, and along, the steel reinforcement surface.

In addition, the porous zones adjacent the steel surface and other inclusions in the concrete provide a pathway for chloride ions and other materials through the concrete composite. In this regard, schematically illustrated in FIG. 3 is a fully permeated conventional concrete mass illustrating a chloride percolation path to, and along, the steel reinforcement surface of an embedded reinforcing bar 30. The scale of FIG. 3 is substantially less than that of FIGS. 1 and 2. As shown in FIG. 3, because the inclusions such as aggregate pieces 32 and sand particles (not shown) generally all have relatively porous interfacial zones, and because at relatively high loadings of sand and aggregate in conventional concrete, the surfaces of the sand and aggregate particles are closely spaced together. The porous interfacial zones of each of the aggregate particles tend to become connected, thereby forming a pathway through the concrete which includes the porous interfacial zone 34 at the steel reinforcement surface. Accordingly, chloride ions and other materials can permeate through the concrete at a rate much faster than the permeation rate through bulk cement paste.

In one example of the present interfaces, a corrosion-resistant layer or alloy is provided at the steel reinforcement surface, between the steel and the cement-reactive layer, to further protect the steel from corrosion. A passivating, corrosion-resisting layer such as an iron silicide surface layer may be readily applied to steel reinforcement such as steel "rebar", beams, wire or mesh, by reaction with silicon at elevated temperatures in the presence of chlorides ("lhrigizing"), or by vapor deposition of silicon, or even electrolytic deposition of silicon. Other materials, such as chromium, boron/borides, nickel, stainless steel, titanium, aluminum, etc. may also be vapor-reacted, electrodeposited and/or thermally sprayed (with or without subsequent hot rolling) onto the steel reinforcement to serve as a very thin, hard, adherent protective layer which is inexpensively applied by plasma, HVOF, TWEA vapor hot metal spray, or combustion thermal spraying onto the surface of the steel reinforcement. The corrosion-resistant layer, such as an iron silicide, iron-titanium, nickel, nickel aluminide, or ferrochrome layer, may be relatively thin, on the order of 0.1 to 100 microns. Silicon, chromium and titanium readily alloy with iron, with Gibbs Free Energy release, so that the iron silicide or other alloy layer is integral with the steel reinforcement, and mechanically much stronger than the bulk cement paste. The ferrosilicon or other intermetallic alloy or silicon coating is thermodynamically less reactive than the untreated steel surface to oxidation in the high pH cement paste environment of the concrete, and/or relatively more passivated with respect to catalytic oxidation in the presence of chloride ion. The corrosion-passivating layer may be very thin, but should be capable of strong chemical (not just mechanical) bonding to a cement-reactive layer, as will be further described.

It is desirable to provide a continuous layer of the alloyed diffused or otherwise chemically passivated surface layer over the steel reinforcing member. In this regard, as indicated, it may be useful to subject the surface to vapor-phase chemical reaction and diffusion, such as by treatment with $SiCl_4$, $BCl_3$, silanes, boron hydrides, titanium chloride (in a reducing environment) or mixtures thereof, at an elevated temperature (e.g., about 400–1300° C. see, e.g., U.S. Pat. Nos. 5,064,691 and 5,089,061), to insure surface reaction. The diffused or alloyed surface layer containing B, Si, Ti, Cr or mixtures thereof may be very thin, e.g., 0.5+15 microns, but should best be continuous. The corrosion passivating layer may be applied during forging or as the steel reinforcement is exiting the rolling mill where it is manufactured, while it is still heated to a rolling/forging temperature of 800–1200° C. Conventional plasma spraying, particularly if applied to a heated reinforcing steel surface, may produce a dense, thin surface zone which at least partially interdiffuses with the steel surface. Fine silicon, boron, titanium, chromium or nickel powders or compounds can be heated to vaporization temperature in a plasma gun system and applied to a hot steel reinforcing bar so that these materials diffuse at the steel surface to form a passivated integral surface layer. High temperature electric arc plasma spraying can also provide high velocity particles and may also heat the steel surface momentarily to cause binding and interdiffusion. High velocity oxygen flame (HVOF) plasma spraying of passivating materials such as silicon or ferrosilicon may also produce a dense surface layer, particularly in view of the ultrahigh velocity of the sprayed particles, which melt and interact upon impacting of the particles at the surface, where the kinetic energy is converted to thermal energy in a relatively instantaneous manner. A reducing atmosphere, and particularly a sputtering of the hot steel surface is best for chemical bonding and diffusion. In this regard, a particularly useful method for applying a passivating alloy surface which is continuous, even on a microscopic basis, is by partially transferred arc and/or rf/plasma arc plasma coating. In conventional plasma spraying and other arc-based thermal sprayed processes, the electric heating arc is transferred internally to the accelerating gun nozzle. In partially transferred arc plasma spraying, the steel surface to be coated with the alloy and/or passivating material is biased with a negative voltage in respect to a positive current source at the interior of the nozzle of the plasma spray device. The positive electrode may be the regular cathode of the plasma spray gun, or may be a separate electrode located slightly downstream of the plasma gun. In addition to the heating current between the internal cathode and internally electrode of the plasma spray gun, a plasma column is provided between the plasma gun and the steel surface which is being coated, which conducts current between the reinforcing steel surface and the plasma gun cathode. Steel reinforcement may form a native oxide surface (e.g., FeO) during its manufacture in a rolling mill, which e removed by the "sputtering" effect of a transferred arc or rf plasma. The plasma functions to ionize and clean oxides and other electronegative components on the surface of the steel, so that they are removed, and to attract ionized metals or silicon or positively charged silicon particles or other passivating materials, which become metallurgically bonded to the cleaned steel surface to form an impervious passivating layer. If, the plasma is a reducing plasma (e.g., contains hydrogen), this may also aid in the formation of a metallurgical bond. As described in U.S. Pat. No. 4,902,870, a radio frequency plasma can be provided to assist maintenance of the arc between the plasma gun and the steel substrate to be coated and alloyed with a passivating material.

A metal (e.g., nickel or nickel alloy) coating may also be adherently applied directly to the steel reinforcement, such as a deformed rebar, by electrolytic or electroless plating processes. Such coatings may be substantially nonporous, and may desirably vary in thickness from about 0.1 to about 100 microns, preferably from about 5–15 microns for economic reasons.

Autocatalytic nickel plating, commonly referred to as electroless nickel plating, can be carried out in an aqueous solution containing nickel (and/or other) metal ions, a reducing agent, chelates, complexing agents and stabilizers. Electroless nickel coatings can be applied as dense alloys of nickel and phosphorus or boron in accordance with standard plating practice. The amount of P or B codeposited can range from less than 1% to 12% using conventional acid (preferable) or alkaline nickel-phosphorus baths. Nickel-boron baths are usually formulated using an amine borane or sodium borohydride as a chemical reducing agent. Alloy deposits with up to 3% boron can be plated from acid as well as alkaline baths. Electroless metal coatings are relatively expensive in comparison to electrolytic coatings. Electrolytic nickel plating solutions using sacrificial anodes can produce deposits relatively rapidly and inexpensively, and can also produce alloy coatings having three or four elements [see, e.g., S. S. Djokic, "Electrodeposition of Amorphous Alloys Based on the Iron Group of Metals", Journal of the Electrochemical Society, 146 (5), 1824–1828 (1999)].

Excellent adhesion of nickel deposits can be achieved on steel rebar with electroless or electrolytic plating, with adhesion strength of from 15,000 to 50,000 psi or more, which can be enhanced by diffusion heat treatment if desired, for example at temperatures of 175 to 750° F. or more for 10 seconds to 3 or more hours.

Low carbon steel rebar is relatively easy to electroplate, and standard cleaning and activation steps should be carried out to produce uniform, high quality continuous metal layers. Low carbon steel reinforcements can be treated with strong mineral acids, including hydrochloric, sulfuric or acid salt mixtures, while high-carbon steels are preferably cleaned with shorter activation times and more dilute acid. The steel rebar may be cleaned and activated directly in an acid (e.g., sulfamate) nickel plating solution by brief anode polarization.

Electrolytic nickel plating, preferably of ductile nickel, can be deposited from a variety of electrolysis formulations in accordance with the plating art. Non-chloride electrolytes, such as sulfate, sulfonate, or sulfamate nickel electrolytes are preferred, because of the undesirability of any chloride inclusion in the coating. Nickel sulfamate solutions are particularly preferred for providing matte, low stress ductile nickel deposits without use of chloride counterions. Sulfur-containing nickel anode materials may be used to control the internal stress of electroformed nickel in Watts and sulfamate solutions.

A wide variety of alloys, including nickel-iron, nickel-cobalt, nickel-manganese nickel molybdenum, nickel phosphorous, and zinc-nickel and mixtures thereof may be electroplated on steel reinforcement to provide an adherent, nonporous metallic corrosion-protecting layer. Iron is relatively inexpensive, and can be provided in the plating bath by electrolytic cleaning of the steel reinforcement prior to electroplating, and can be subsequently plated back on the rebar to reduce or eliminate waste. Cobalt and manganese may be used to increase the hardness and strength of nickel plating. To reduce the cost of nickel plating, up to 35 percent of the nickel may be replaced with iron. While nickel-iron plating is less resistant to corrosion than nickel, this may be partially compensated for by increasing the plating thickness. The nickel-iron alloy layers also are relatively ductile. Solutions for plating nickel-iron are slightly more dilute than nickel plating solutions and it is desirable to keep the ratio of ferrous iron to ferric iron at least about 4:1. Solution temperature is typically 130 to 140° F. The pH should be kept at 2.8 to 3.6. Ductility depends on iron content, solution temperature and pH. To reduce internal stress, the iron content may desirably be kept below 10% by weight, based on the nickel-iron alloy and the pH below 4.5 (preferably below 3.25).

Preferably after electrodepositing (by electrolytic or electroless processes) a continuous adherent corrosion-protective metal layer on the steel reinforcement, particles of material such as silica and/or silicon which are reactive with cement paste may be electrodeposited on the continuous layer. The particles suspended in the electrolytic bath are drawn to and held at the steel reinforcement surface by electropotential forces, while metal is deposited around the contacting particle. Particles of ground granulated blast furnace slag may also be used, but they should be first pre-soaked in a nickel sulfamate (or iron sulfamate, etc.) both to substitute nickel ions or alter "platable" ions for the calcium ions at the surface of the particles. Otherwise, calcium, magnesium and other "upalatable" salts will be boiled up in the plating bath.

Submicron particles of Cr in the plating bath may be electroplated directly with the nickel layer. Hydrated cement-reactive particles, for example, having a particle size in the range of 0.1 to 100 microns, may similarly be included suspended in the plating bath, and attached to the surface of the rebar with the electroplated metal. If the particles are relatively nonconductive, such as silica fume, larger silica particles or surface-ion-exchanged blast furnace slag, their top surfaces will remain exposed for reaction with the cement.

If the particles are conductive, such as silicon particles, they may be more easily embedded in the metal matrix, or only partially exposed, but are available to be more further exposed upon flexure or damage to the surface, whereupon they may participate in "healing" the damage by electrochemical reaction to form dense silicate. The electrochemical reaction will protect the underlying steel reinforcement for corrosion.

A matte or even more irregular metal plate finish provides a more adherent surface for subsequent thermal spray of slag or other cement-reactive coatings.

Figure 11:
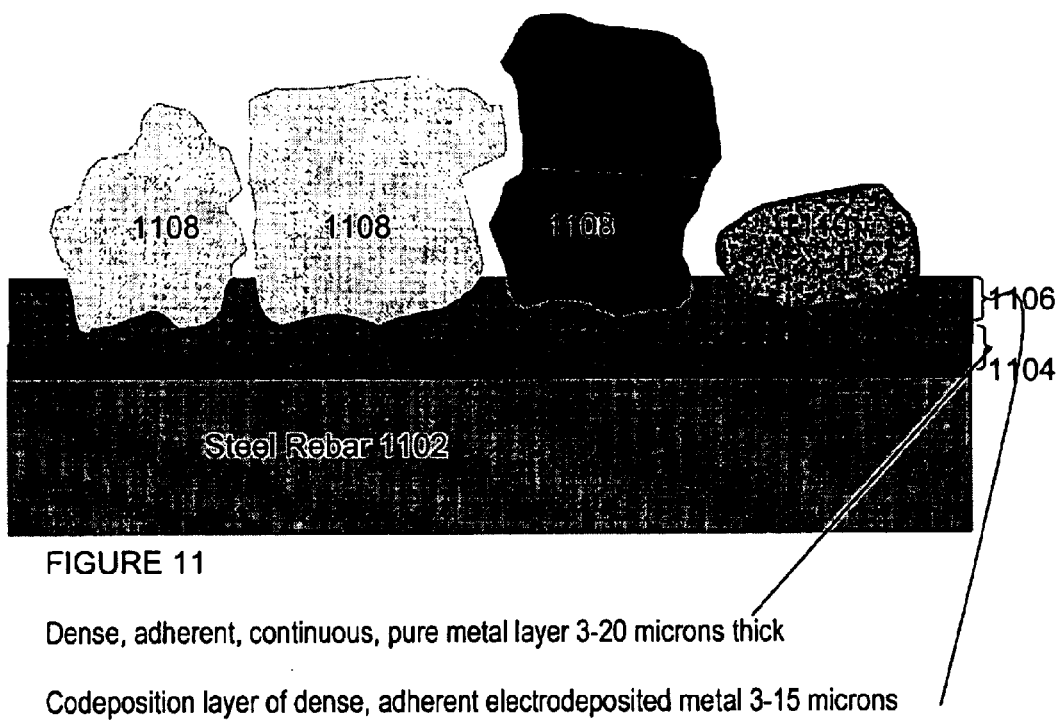
FIG. 11 is a schematic cross section of a steel reinforcing bar having an adherent dense, continuous electroplated nickel layer immediately adjacent the steel surface, and an outer nickel layer codeposited with cement paste-reactive particles such as silicon and/or silicon particles.

Schematically illustrated in FIG. 11 is a cross sectional view of the surface of a steel rebar 1102 on which has been electrodeposited a "pure" ductile nickel or nickel iron adherent layer 1104 with a thickness of 3–20 microns from a conventional sulfamate bath. Subsequently the nickel-plated bar is moved to a second nickel plating bath in which are suspended silica particles 1108, and/or silicon particles 1110 having a diameter of 10–60 microns. The particles are densely codeposited with a second nickel layer 1106 similarly having a thickness of about 3–15 microns. The nickel firmly anchors the silica and/or silicon particles 1108, 1110, and may even plate out on the conductive silicon particles. The rebar 1102 thus has an adherent surface which is reactive with hydrating cement, and an intermediate corrosion protective layer. Ground blast furnace slag may be used as a codeposition material, but should best be contacted with a nickel sulfamate, or even as ferrous iron salt mix to displace surface calcium and magnesium ions.

Also applied to the steel reinforcement is an outer layer of an inorganic ceramic or glass, such as an alkaline earth silicate, (e.g., calcium silicate), aluminate, a phosphate, and/or a silica or alumina layer, which is also integrally bonded to the iron silicide layer, and which is reactive with the hydraulic cement paste. It is also stronger than the bulk cement paste, and has a relatively strong bond to the steel reinforcement such that the steel-ceramic composite is itself stronger than the bulk cement paste. In this regard, thermal spraying is conventionally used for applying strongly bonded ceramic and metal layers for mechanically demanding applications such as turbine blades, so the strength and bonding capabilities of thermal spray systems are more than adequate for reinforced concrete bonding needs. The composition of the inorganic ceramic or glass layer, such as a cementitious calcium silicate layer, may be primarily in the mono- to di-silicate range (e.g., powdered blast furnace or other slag, fly ash, burned shale ash or other such material, which is compatible with and participates in and participates in cement hydration reactions and makes an inexpensive raw material source), so that it remains stable in unhydrated form for storage of the reinforcing bars prior to use. As indicated, powdered silica and/or alumina may also be used as a reactive interface material.

The calcium silicate layer may also be relatively thin, but should desirably be sufficiently thick that it does not become fully hydrated throughout its thickness during the hydration of concrete. Because the cores of conventional Portland cement particles over 50–100 microns in size may remain incompletely hydrated in conventional concrete after decades, a thickness of 50–100 microns of a less reactive lower calcium silicate layer should be more than adequate. Such a vitreous or ceramic layer may also be quite mechanically strong compared to the cement paste, and is integrally bonded to the iron silicide, iron titanide or other iron-passivating layer. The calcium silicate layer may also be applied by relatively inexpensive high-temperature plasma, HVOF or combustion thermal spraying. The thin, refractory, adherent, unitary, inorganic layers may readily be applied during steel rebar manufacture. There are some adhesion and efficiency advantages in high-speed application of the layers in the rolling mill before the steel reinforcement bars have completely cooled.

The outer surface of the calcium silicate layer may preferably be applied with a somewhat greater degree of open porosity (e.g., 5–20/o) than the interior layer (e.g., 015% porosity) to further assist the formation of a functionally graded interface with the bulk cement matrix. Because of the relatively low thermal spray temperatures required for calcium silicate application, the low cost of the materials (e.g., fly ash or blast furnace slag) and the thinness of the layers, the cost of application is relatively low. As indicated earlier, an adhesion-promoting layer may be utilized to promote chemical bonding of the metallic steel or steel alloy surface with the ceramic vitreous coating. An extremely thin layer of boron or silicon oxide groups (such as a mono layer or surface silanol groups) may be formed at the surface of the iron silicide and/or boride layer formed at the surface of the reinforcing steel, which can chemically bond with the thermally applied glass or ceramic layer. Similarly, a very thin layer of chromium, titanium or nickel oxide may form an adhesion-promoting layer, particularly if in a partially-oxidized metallic, or lower oxidation state.

Figure 4:
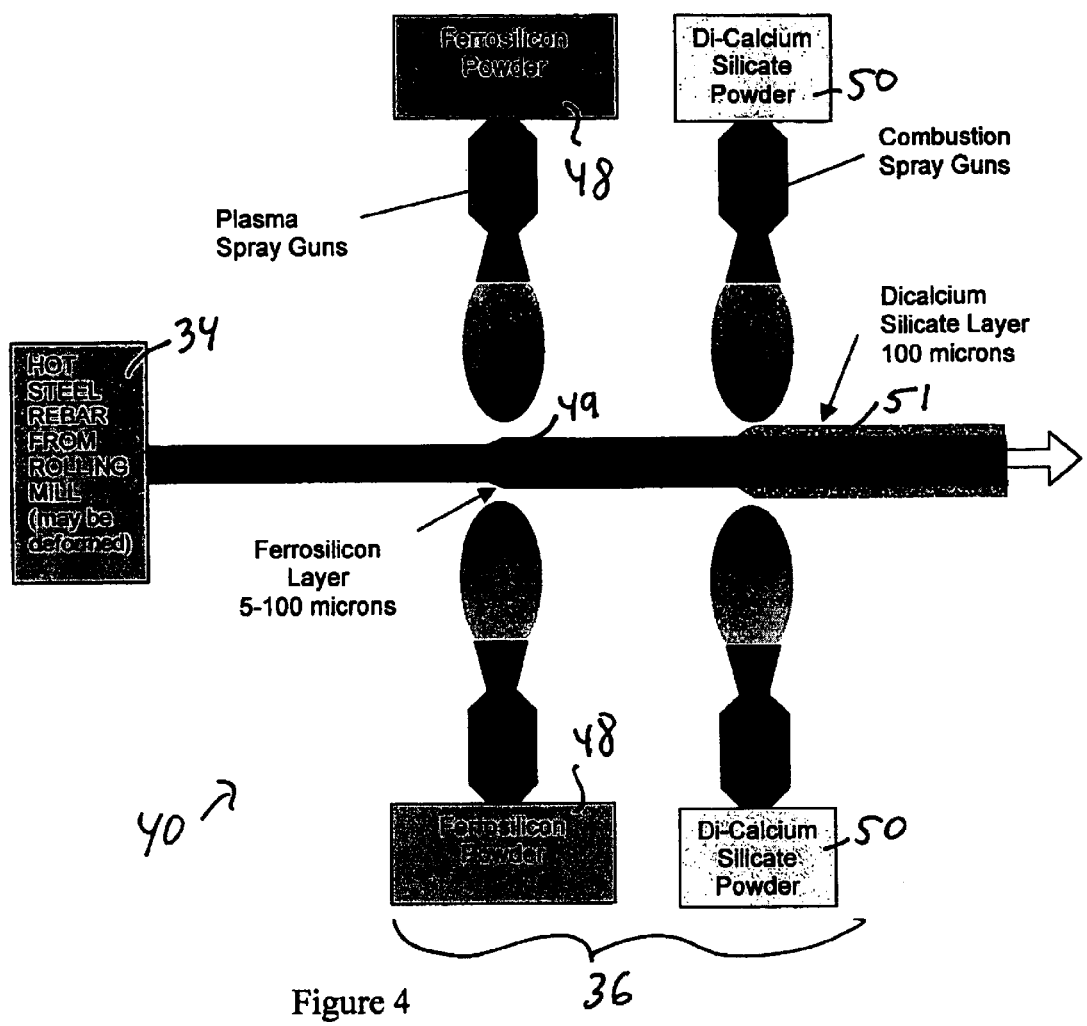
FIG. 4 is a schematic illustration of a thermal spray system for integrally applying corrosion resistant and hydraulically reactive layers on hot reinforcing bar stock.

FIG. 4 illustrates a thermal spray system 40 for applying corrosion resistant and hydraulically reactive layers on steel reinforcing bar stock as produced by a conventional rolling mill. As shown in FIG. 4, a finished steel reinforcing bar 42 from a rolling mill 44 is continuously transported through a thermal spray station 46. The reinforcing bar (or "rebar") stock may still be at elevated temperature such as 500–1200° C. from its manufacture. The thermal spray station 46 comprises a thermal spray station 48 for applying a passivating corrosion-resistant layer such as a silicon or ferrosilicon layer 49, and thermal spray station 50 for applying a hydraulically reactive ceramic material layer 51 on the corrosion-resistant layer 49. The thermal spray station 48 desirably comprises at least three thermal spray guns spaced radially around the reinforcing bar, so that the entire surface of the bar is coated on a continuous basis as it is conducted through the thermal spray station. Because the steel bar may form a native oxide (such as FeO) on its surface during its manufacture in the rolling mill, the thermal spray may also desirably be operated with a reducing atmosphere. Preferably, the thermal spray guns function to "sputter-clean" the reinforcing bar surface as the corrosion-resistant layer 49 and/or diffusion is applied. In applying the ferrosilicon layer, a relatively fine silicon or ferrosilicon powders are preferably used, with relatively high plasma operating temperatures, so that at least a portion of the silicon or ferrosilicon is vaporized, for subsequent condensation on this heated steel reinforcing bar surface, to provide a continuous layer. The silicon/ferro silicon will quickly diffuse/alloy with the steel rebar at its elevated temperature. An adhesion-promoting layer may be applied between the silicon/ferrosilicon layer. A fine aqueous spray of a chromium, nickel or titanium oxide-based solution or slurry may be directly applied to the hot steel surface, which will promote fusion and bonding at the elevated processing temperatures (e.g., 400–1200° C.) with the subsequently applied ceramic or vitreous layer. The thermal spray station for the ceramic layer application may also desirably be a low-cost combustion system or HVOF system.

Figures 5, 6:
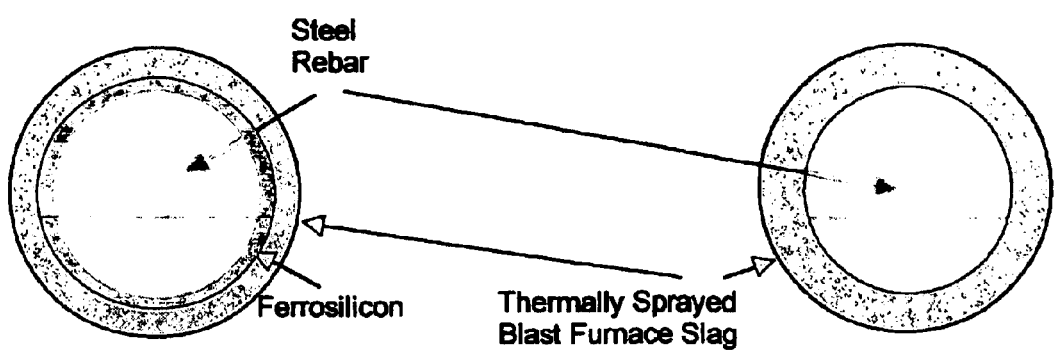
FIG. 5 is a schematic cross sectional view of a steel reinforcing bar having an integrally bonded, thermally sprayed layer of silicon or ferrosilicon alloy on the steel surface, and an integrally bonded, thermally sprayed layer of hydraulically reactive cementitious material such as blast furnace slag integrally adherently bonded to the silicon or ferrosilicon layer.
FIG. 6 is a schematic cross-sectional view of a steel reinforcing bar having a thermally sprayed, dense adherent layer of hydraulically reactive cementitious material such as blast furnace slag integrally adherently bonded directly on the exterior steel surface.

The relative position of thermally applied layers is shown in cross-section in FIGS. 5 and 6.

Figure 7:
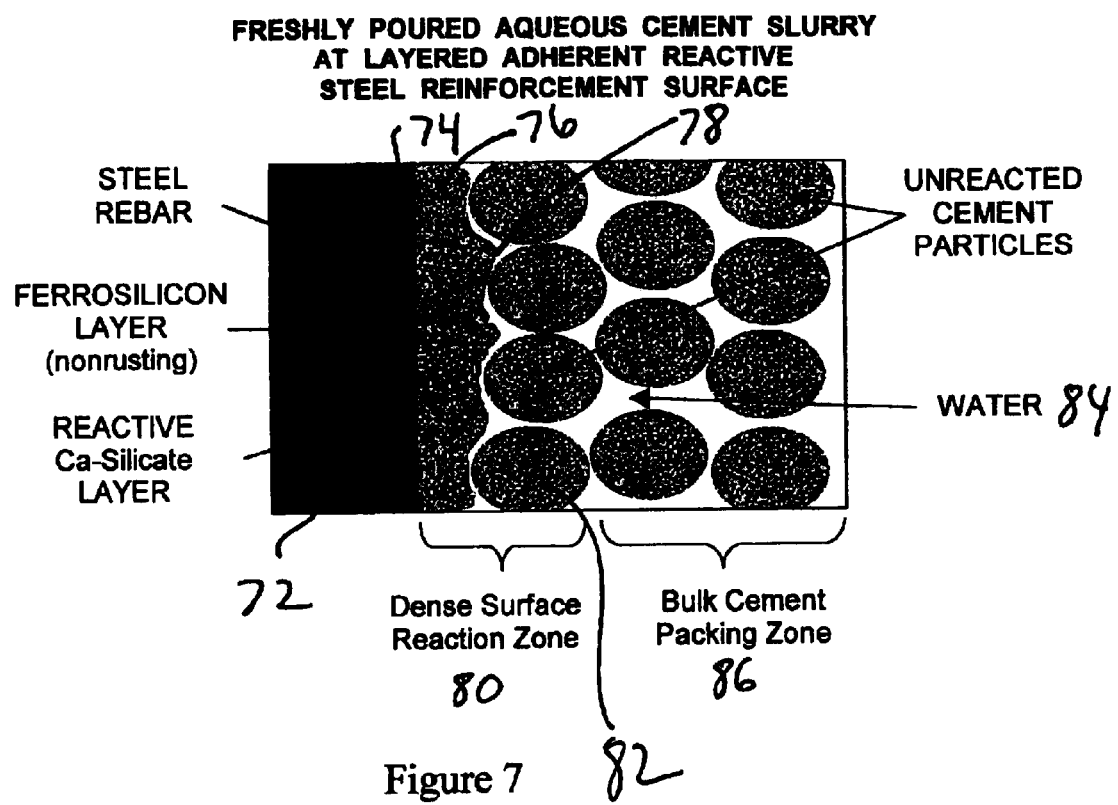
FIG. 7 is a schematic illustration of a freshly-poured aqueous cement slurry at a layered, adherent, reactive steel reinforcement surface prepared in accordance with the embodiment of FIG. 5.

FIG. 7 is a schematic illustration of a freshly poured aqueous cement slurry at the surface of a thermally sprayed steel reinforcing bar embedded in the cement slurry. As illustrated in FIG. 7, the steel reinforcing bar 72 has an adherent, thin, thermally sprayed ferrosilicon or silicon layer 74 at its surface, which is substantially more passive with respect to both rusting, and chloride ion-catalyzed oxidation, than the bulk steel of the reinforcing bar 72. Silicon can be used to produce a surface which is relatively inert to oxidation catalyzed by the chloride ion. The silicon readily alloys with and diffuses into iron at moderately elevated temperatures, which are present immediately after manufacture of the rebar in a steel rolling mill, and/or which can be briefly applied to the surface of the reinforcing bar without damaging the internal metallographic structure, to form a variety of ferrosilicon compounds or solid solutions. A passivating silicon alloy layer can be provided by exposure to silicon-containing gases such as $SiCl4$ at elevated temperatures (see, e.g., U.S. Pat. Nos. 3,433,253 and 5,200,145). Pure silicon powder can also be thermally sprayed to produce a relatively inert layer of silicon and/or ferrosilicon alloy. However, for economic reasons (because $SiCl_4$ gas treatment and pure silicon powder is relatively expensive), industrial ferrosilicon can also be used to provide a surface which is relatively passivated with respect to oxidation under chloride-catalyzed conditions. Ferrosilicon can be produced at very low expense, and provided in powdered form for thermal spray volitalization and/or application to the surface of the steel reinforcement to produce an intimately bonded, alloyed layer at the surface. Similarly, boride materials may be provided and plasma-vaporized at lower expense than boron hydride materials.

The corrosion-resistant ferrosilicon layer 72 has an intimately adherent cementitious layer 74, which is thermally sprayed thereon and bonded thereto. The illustrated cementitious layer may be an industrial-grade calcium silicate, such as the primarily dicalcium silicate materials of blast furnace slag waste products. The thermally-applied cementitious layer may desirably be graded, either continuously, or discreetly, so that it is more dense and/or more unreactive in the high pH environment of a cement mix, immediately adjacent the ferrosilicon layer 74. Conversely, the layer 76 may be more porous and/or more hydraulically reactive at the exterior surface 78 facing the aqueous cement mix. For example, a calcium silicate powder which crystallizes to form a relatively inert material such as wollastonite, may be applied using HVOF thermal spraying to produce a very dense, relatively crystalline layer which strongly adheres to the ferrosilicon or silicon surface 74. An external layer of predominantly dicalcium. silicate, such as fly ash or blast furnace slag, may be applied over the calcium silicate layer, using a lower velocity HVOF or plasma spray gun, to produce and external layer which is relatively more hydraulically reactive in the aqueous high pH environment of the cement mix. By controlling the thickness of the external, more reactive layer, the amount of reaction may be precisely controlled, to ensure that an adherent, dense, protective inorganic oxide layer remains adjacent the steel surface to contribute to the protection of the underlying steel reinforcement. An extremely thin adhesion-promoting layer (not shown), for example of chromium oxide, titanium dioxide or lower oxide, or nickel oxide may be present between the ferrosilicon surface of the steel bar, and the cementitious calcium silicate layer 76.

As indicated in FIG. 7, the external surface 78 of the thermally sprayed reactive layer 76 need not to be completely smooth, and may also have some degree of porosity, which may permit a denser aggregation of cement particles adjacent the surface. In any event, the physical density of the calcium silicate layer 76 at the external surface should best be at least 75 percent solid (less than 25% porosity), as compared to a lower concentration of cement particles in the cement mix, and accordingly, the unreacted cement particles 82 of the freshly poured aqueous cement slurry may form a relatively dense surface reaction zone 80 together with the thermally sprayed reactive layer 76. The unreacted cement particles in the water matrix 84 away from the immediate surface of the zone 80 may be in a zone 86 having the conventional bulk cement packing density.

The thermal spray guns may also apply relatively inert fibers, such as alumina fibers or zirconia-based high-pH-stable cement fibers with the cementitious layers. These fibers may be relatively small in diameter (e.g., 2–25 microns) and length (e.g., 25–200 microns), but can considerably strengthen the hydrated cement layer which is formed around the steel reinforcement. The volume of reinforcing fibers may desirably be in the range of 2–25 percent of the volume of the cementitious thermally sprayed layer 76.

Upon hydration, the ceramic external layer 76 of the treated steel reinforcement presents a reactive surface which partially hydrates with the bulk cement paste. It preferably does not completely hydrate, however, because it is thicker and less reactive than the cement particles, which themselves may not fully hydrate. A strongly adherent, unhydrated layer of the calcium silicate is accordingly retained on the steel surface. The high density, unhydrated calcium silicate at the steel surface, and the graded participation of the surface in the cement hydration reaction, inhibits the formation of a porous weak interface zone. Corrosion-causing chloride percolation along the steel surface is therefor restricted, because there is no weak, porous zone adjacent the steel surface. Instead, a dense, relatively impermeable reaction zone is created which is bonded to the steel surface, and efficiently transmits mechanical forces without being a "weak link". The optional non-rusting ferrosilicon, ferrotitanium or other corrosion-passivated layer is retained as a further protection for the reinforcing steel:

The net result is a dense interface, adherently chemically bonded to the steel surface, which is thereby protected from corrosion, and which transmits mechanical forces between the steel reinforcement and the bulk cement matrix. The interface is desirably stronger than the bulk cement paste. The interface is not porous, and does not promote the percolation of water or corrosion-inducing chloride ions through the cured concrete or along the surface of the steel reinforcement. Because the interface integrally bonds the steel reinforcement to the bulk cement matrix with an adhesion strength desirably at least equal to the strength of the cement matrix, the mechanical properties of the reinforced concrete are maximized, rather than minimized by a porous interface zone.

Instead of, or in addition to, the thermally sprayed cement-reactive layer, a protective layer may also be applied which is stable in storage and at relatively neutral (e.g., 5–8) pH, but which reacts with the caustic, high pH calcium ion environment of hydrating cement paste (greater than pH 10.0) to form a stable, relatively strong interlayer material. For example, silicone resins such as those formed of dimethyl silane groups are slowly hydrolyzed in a caustic cement paste environment to form an impervious calcium silicate-methyl silicate material. The hydrolytic stability of the silicone resin may be reduced by including amine groups, such as those present in amine corrosion inhibitors, in the silicone polymer or material.

A wide variety of amine corrosion inhibitors for steel are commercially available. They may be simply blended (e.g., at 1–10 weight percent) in the silicone resin applied to the steel rebar, or they may be incorporated in the polymer chain of the silicone or other cement paste (caustic of pH>10) degradable polymer (e.g., triethanol amine may be used to cross link dimethyl silanes, or to provide hydroxyl group polymer chain ends when used in excess. The corrosion inhibitor is slowly released in the zone immediately adjacent to reinforcing steel as the organopolymer layer is slowly converted to calcium silicate compounds upon reaction with the hydrating cement paste.

It is particularly desirable to include particulate cement-reactive material in the cement-degradable polymer. For example, silicon particles and/or slag particles may be included in the silicone or other cement-reactive polymer at levels of from about 1 to about 50 percent by weight or more, preferably 5–40% by weight, based on the total weight of the polymer and particulate inclusion. The particles may desirably have a particle size in the range of 0.1 to about 75 microns. Ground blast furnace slag having a particle size in the range of 10–100 microns may be incorporated in silicone resin at a level of 10–45 weight percent, and applied to a steel rebar (with or without an intermediate corrosion protective metal layer) to form a continuous composite layer having a thickness of 20–200 microns (preferably 25–100 microns).

Similarly, the silicone resin layer may include 5–50 weight percent of silicon particles having a particle size of 1–75 microns, to form a composite layer which will protect the steel rebar in storage and pre-installation transport, but will slowly react in contact with the hydrating cement paste at pH greater than 10.

These particles will be available for reaction with calcium ions to form a dense, impervious layer adjacent the steel reinforcements. In addition, when silicon powder or particles are included, and in effective electrical contact with each other and the steel reinforcement (directly or through a protective metal layer thereon), the reaction of the silicon electrolytically protects and insulates the steel from chloride attack.

The cement-reactive organopolymeric coatings can have a high degree of flexibility, which is advantageous during forming or installation of the steel reinforcement.

Small amounts (e.g., less than 5 weight percent) of chloride sequestering materials such as lead or silver oxide (e.g., from inexpensive ore) may be included in the thermally sprayed or organopolymeric cement-reactive layer, to limit chloride penetration.

Figure 8:
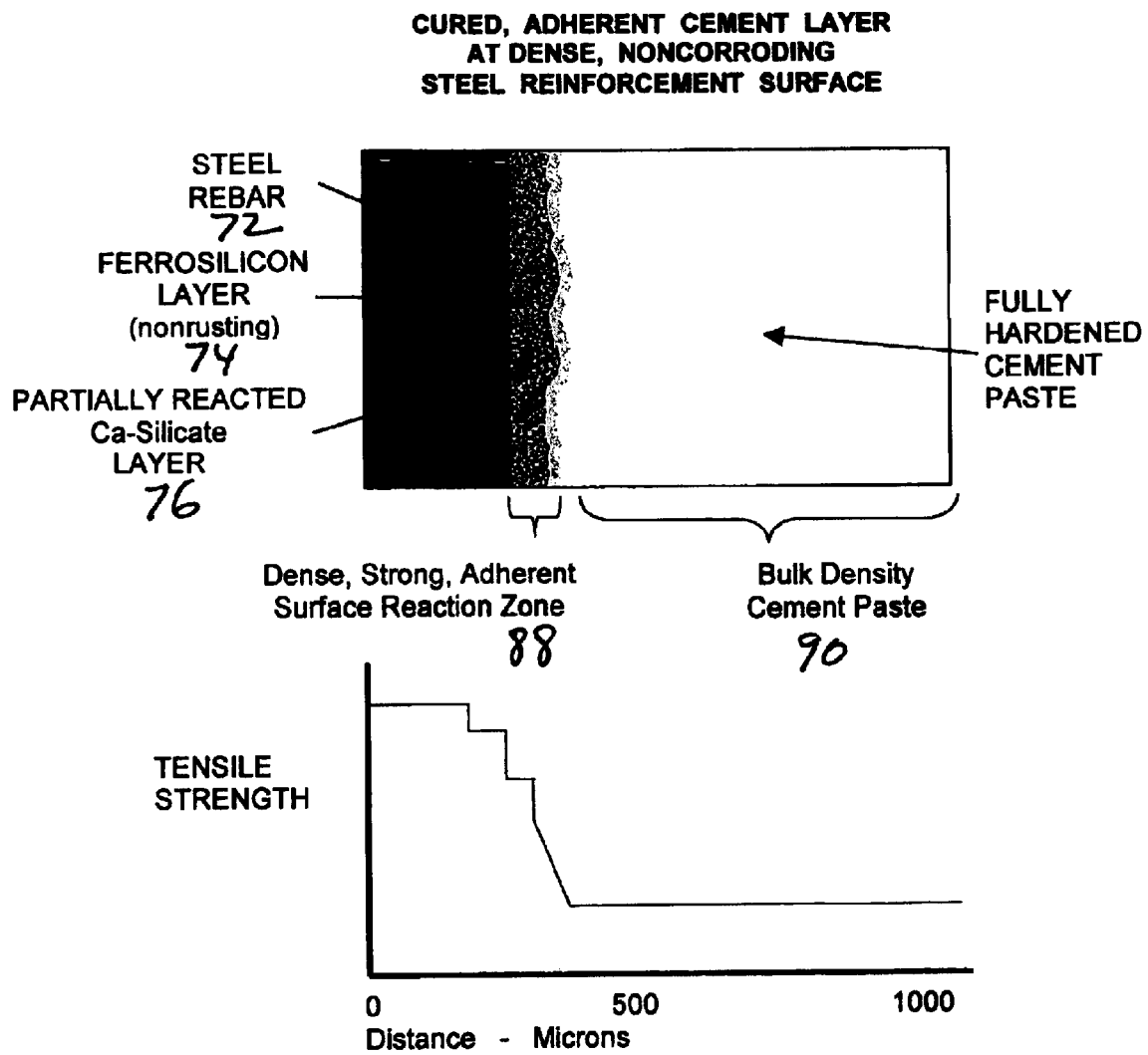
FIG. 8 is a schematic illustration of a cured cement layer at the non-corroding steel reinforcement surface of the embodiment of FIG. 5, which has a relatively strong interface and which is protected from corrosion.

Upon hydration or partial hydration, the reactive calcium silicate layer 76 interacts with the cement particles to prevent the formation of a relatively porous and weak interfacial zone between the steel reinforcement and the bulk cement paste. In this regard, schematically illustrated in FIG. 8 is a cured, adherent cement layer at a dense, non corroding steel reinforcement surface. As illustrated, upon curing or partial curing of the cement particles in the cement mix, the steel reinforcement 72 still retains its adherent ferrosilicon layer 74 which passivates the iron against chloride-catalyzed oxidation, and a portion of the calcium silicate layer 76, which is itself strongly adherent to the ferrosilicon layer 74 by virtue of the thermal spray processing of its application. The presence of silicon, titanium or other similar strong matrix oxide forming elements in the corrosion-passivating layer facilitates the formation of a strong, adherent chemical bond therebetween. However, the exterior surface of the calcium silicate layer 76 has reacted by hydration with the cement mix to form a relatively dense, strong adherent surface reaction zone 88 which may be denser and stronger than the fully hardened cement paste 90 which is formed at the bulk density of the original cement mix. The tensile strength of the composite structure is schematically shown in the graph below the structure illustrated in FIG. 8, and in registration therewith. As indicated, the tensile strength of the steel reinforcement is relatively high, and the ferrosilicon, ferrochrome or ferrotitanium layer 74 is generally relatively lower in view of its increased brittleness. Similarly, the tensile strength of the unreacted calcium silicate layer 76 is relatively lower than that of the silicon, ferrotitanium, ferrochrome or ferrosilicon layer 74, but still substantially higher than the bulk density cement paste. The surface reaction zone (like the zones immediately surrounding the individual cement particles) is denser and stronger in the direction of the hydration reaction adjacent the unreacted surface zone, and tapers toward the tensile strength of the bulk density cement paste. Accordingly, the composite structure of FIG. 8 does not produce a "weak link" of porosity adjacent the steel reinforcement. Rather, a functionally graded interface is produced which has a gradient of properties which gradually transitions to that of the bulk density cement paste 90. In addition, it will be noted that the ferrosilicon layer 74 and the partially unreacted calcium silicate layer 76 physically limit the access of chloride ion and oxygen to the iron surface, thereby restricting oxidation. Moreover, there is no porous zone immediately adjacent the steel reinforcement surface for the passage of corroding environments along the reinforcement surface.

As indicated, the functional layers may be applied by thermal spraying, which is an economical technology for applying thin, adherent layers of refractory materials. In such thermal spraying, very small molten particles (e.g., 10–50 microns) and vaporized portions of the material to be applied are accelerated by combustion gases or an electric arc plasma, followed by deposition or impacting onto the steel reinforcement surface. For the metallic passivation layer, the steel surface may be heated so that the passivating components can diffuse into the steel surface to form an integrally-passivated layer. For the application of cementitiously-reactive ceramics, solidification typically occurs at very rapid rates, so that the as sprayed deposit is ultra-fine grained. This fast cooling should stabilize calcium silicates in the high-density gamma crystalline form desirable for use in hydraulic cements.

Thermal spray application of the functional layers is a relatively inexpensive and efficient method for integrally applying the functional layers to the reinforcing steel. A wide range of materials has been successfully plasma-sprayed for a variety of applications, including gas turbine components having complex geometries [M. R. Jackson, et al, "Production of Metallurgical Structures by Rapid Solidification Plasma Deposition", J *Metals*, 33, November 1981, 23–27; S. Sampath and H. Herman, *J Metals*, 45(7) (1993) 42; R. Tiwari, et al., "Plasma Spray Consolidation of High Temperature Composites", *Mat. Sci. and Eng*. A144 (1991) 127–131; M. Moss, Acta Met., 16 (1968) 321; V. Wilms, Ph.D. Thesis, SUNY Stony Brook (1978); K. D. Krishnan- and and R. W. Cahn, Rapidly Quenched Metals, Ed. N. J. Grant and B. C. Giessen, pp. 67–75, MIT Press, Cambridge, 1976; S. Sampath and S. F. Wayne, "Micro structure and Properties of Plasma Sprayed Mo—Mo2C Composites", *J Thermal Spray Tech*. Vol.3, No.3 (1994) 282; S. Sampath, et al., "A Structural Investigation of a Plasma Sprayed Ni—Cr based Alloy Coating", *J Mater. Res*., Vol.8, No. 1 (1993), 78 as referenced in "Thermal Spray Coatings", H. Herman and S. Sampath, The Thermal Spray Laboratory, Department of Materials Science and Engineering, State University of New York, Stony Brook, N.Y. 11794-2275] and medical implants. The temperature of a plasma may be as high as 15,000° C. for a typical dc plasma torch, but the application of calcium silicate does not require such high temperatures. Other thermal spray processes such as High Velocity Oxy-Fuel Spraying (HVOF), in which a high temperature oxygen-fuel flame undergoes free-expansion from the torch nozzle, to accelerate the particles to a high velocity (e.g., over Mach 3) may be used to produce dense, adherent coatings. In standard combustion spraying, which is by far the least expensive process, (which may be suitable for calcium silicate layers), a fuel-air flame is used. In plasma spray processes, which can be significantly hotter, an electric arc rather than combustion creates the extremely hot thermal zone. In all of the thermal spray processes, the calcium silicate feedstock or other metallic or ceramic powder is injected into either the rear of the torch or into the plasma or other heated high velocity stream, and the melted particles are accelerated toward the steel surface. Upon impact, the particles convert kinetic to thermal energy, and bond to the surface to produce a dense, strongly adherent coating. Deposition rates of, for example, 2–20 kg/hr per nozzle, with excellent adherence, may be provided onto steel reinforcement bars exiting a rolling mill at about 200–400° C. in the processing zone. Porosity should desirably be controlled in the application of the calcium silicate layers, for example in the range of from about 2–25 percent porosity (95–98 percent solid calcium silicate or calcium silicate plus reinforcing fibers).

Generally, as particle velocity increases, the porosity decreases. Similarly, the smaller the particle size, the lower the porosity for typical thermal spray systems.

EXAMPLE I

Three steel reinforcing bars (or dowels) without ribs or surface deformations, nominally ½ inch in diameter and 2 feet long, are cleaned of rust and surface oxidation by sand blasting. All bars receive the same sand blasting treatment. One of the bars is placed on a rotating mandrel and coated with a very thin layer of silicon using a high temperature helium plasma Praxair/Miller Thermal SG-100 Plasma Spray System, so that substantially the entire surface of the bar is coated with the silicon layer.

The SG-100 plasma spray gun uses a non-transferred dc plasma torch configuration with powers up to 100 kW (here, about 40 kW). The basic design of the plasma gun consists of two electrodes: a cone-shaped cathode inside a cylindrical anode, which forms a nozzle. Gases (e.g. argon, hydrogen, helium) can flow through the space between the electrodes, where they are ionized to form a plasma. Typically, the primary gas is argon (100 scfh) and the secondary gas is helium (60 scfh). The powder carrier gas is typically argon (15 scfh). A four hole gas ring is utilized to induce vortex flow in the electrode.

Powders injected into the plasma are accelerated and melted by its high temperature. The molten droplets (i.e. splats) are propelled onto the substrate where they solidify and accumulate to form a well-bonded coating.

The first bar (Bar 1) was placed on a rotating mandrel, and silicon was applied by plasma spray along its outer surface. Silicon was applied to the second bar (Bar 2) by plasma spray along a longitudinal strip along the bar length, without mandrel rotation. The silicon is applied at a low feed rate, in order to heat the bar and provide an opportunity for some diffusion of the silicon into the surface of the bars. The bars are not preheated, so diffusion was limited, and the silicon formed a surface layer. All three bars were subsequently coated with ground blast furnace slag using the same helium plasma gun. The third bar (Bar 3) was accordingly directly coated by plasma spray of ground blast furnace slag to the sand blasted surface of the steel reinforcing bar, without an intermediate silicon layer.

The ground granulated blast furnace slag (GGBFS) used was a product commercially available under the tradename GranCem from Holnam, Inc., 6211 Ann Arbor Road, Dundee, Mich. 48131. It was thermally sprayed using the plasma spray gun operated at about 40 kW. The GGBFS had the following specifications:

| ASTM C 989 | |
|---|---|
| Grade | 100 |
| $SiO_2$ | 30–39 |
| CaO | 34–45 |
| $Al_2O_3$ (%) | 8–13.5 |
| $Fe_2O_3$ (%) | 0.5 max |
| MgO (%) | 5–13 |
| $TiO_2$ (%) | 0.7 max |
| S (%) | 0.5–2.2 |
| MnO (%) | 0.2–1.5 |
| Cl (%) | 0.06 max |
| $SO_3$ (%) 4 max | 0.06 max |
| $P_2O_5$ (%) | 0.3 max |
| Glass | 85% min |
| 7 day Slag Activity Index | 85 +/− 5 |

| ASTM C 989 | |
|---|---|
| Grade | 100 |
| 28 day Slag Activity Index | 115 +/− 5 |
| −325 M (%) | 96 min |
| Blaine +/− 20 (m2kg) | 550 |
| Air +/− 1.5 (%) | 4 |

The GGBFS is intended for use in admixture with portland cement and is accordingly compatible therewith. The GranCem cement is made to meet the requirements of ASTM C 989 (equivalent AASHTO specification is M 302), which lists three grades of GGBF slag: Grade 80, Grade 100 and Grade 120. Grade 100 was utilized in the present example. The sample used has the following characteristics according to the Chicago Grinding Facility of Holnam, Inc.:

| SLAG ACTIVITY INDEX SPECIFICATIONS MINIMUM | | | | |
|---|---|---|---|---|
| Grade | Average of last 5 | | Individual Test | |
| Age | 7 day | 28 day | 7 day | 28 day |
| 80 | N/A | 75% | N/A | 70% |
| 100 | 75% | 95% | 70% | 90% |
| 120 | 95% | 115% | 90% | 110% |

| SLAG ACTIVITY INDEX | | |
|---|---|---|
| Age | 7 d | 28 d |
| Individual Result | 90% | 115% |
| Average of last 5 | 86% | 121% |

| SLAG-REFERENCE CEMENT MORTAR PERFORMANCE | |
|---|---|
| Compressive Strength at 7 d | 26.31 MPa |
| Compressive Strength at 28 d | 42.85 MPa |

| REFERENCE CEMENT MORTAR PERFORMANCE* | |
|---|---|
| Compressive Strength at 7 d | 29.13 MPa |
| Compressive Strength at 28 d | 37.32 MPa |

| SLAG CHEMICAL DATA | | | |
|---|---|---|---|
| | | Specifications | |
| Sulfur content (S-2) | 1.06 | (ASTM C 114) | 2.5% Max. |
| Sulfate ion reported at S03 | 0.27 | (ASTM C 114) | 4.0% Max. |

| OTHER SLAG DATA | | | |
|---|---|---|---|
| | | Specifications | |
| Blaine Fineness (mm^2/kg) | 565 | (ASTM C204) | N/A |
| Retained on 325 mesh (45 micron) | 2.40% | (ASTM C430) | 20% Max. |
| Air content of slag mortar | 2.87% | (ASTM C185) | 12% Max. |
| Slag density (gm/cm^3) | 2.74 | (ASTM C188) | N/A |

| Reference Portland Cement Data (ASTM C 150) | | | |
|---|---|---|---|
| | | Specifications | |
| Blaine Fineness | 380 | (ASTM C204) | 200 m2/kg min. |
| Total Alkalies (Na20 + 0.658 K2O) | 0.8 | (ASTM C 114) | 0.6–0.9% |

*Individual test [_] or Average of 5 tests [X]

The adherence of the layers applied to Bars 1 and 2 was tested by a high speed abrasive wheel (Dremel at 30,000 rpm) and found to be hard and adherent. FIG. 9 is a photomicrograph of Bar 3, showing an abraded surface of the steel about 3 min wide, and the surface texture of the applied GGBFS. FIG. 10 is similarly a photomicrograph of Bar 1, showing the abraded steel about 3 min wide, and the surface texture of the GGBFS layer. The intermediate silicon layer can also be seen In FIG. 10.

Bars 1, 2 and 3, and an uncoated steel reinforcing bar, were cast in (Sakrete brand) mortar mix, which appeared to be "lean" in cement. The bars were examined after the mortar mix cured for 2 weeks in a plastic enclosure at 100% relative humidity. While there was rust on the exposed uncoated rebar, there was no rust on any of the coated portions of the rebar. The test samples were further examined by cutting through the bars and cured concrete, and applying saturated salt (NaCl) water, followed by humid air exposure for a week. The uncoated steel separated easily and cleanly from the surrounding cured cement, leaving a smooth concrete surface. The coated steel bar segments broke away from the cured concrete only with force, leaving a broken, irregular concrete surface, with concrete adhering to the coated steel surfaces. The uncoated steel sections rusted, while the slag-only coated bar and the silicon and slag-coated bar were rust resistant.

Figure 12:
FIG. 12 is a photograph of a nickel-plated and composite silicon-particle-nickel plated steel reinforcing strip, and a steel reinforcing wire which has been copper base-plated, nickel plated atop the copper base-plate and which has had a nickel-silicon powder composite plated atop the nickel plate.
Figure 13:
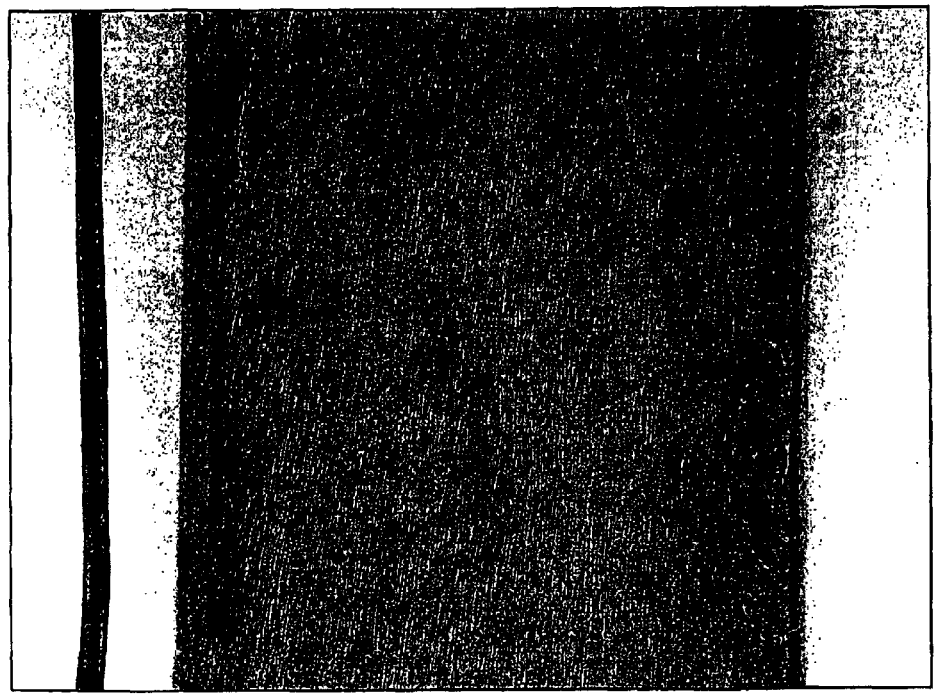
FIG. 13 is a photograph of the reverse side of the nickel-plated steel reinforcing strip, which does not have a nickel-silicon powder composite electrodeposit and a portion of the copper and nickel-plated steel reinforcing wire which does not have a nickel-plated silicon powder composite electrodeposit.

A hot-rolled steel strip approximately ½ inch wide and ⅛ inch thick was cleaned of surface oxide (including a short anodic treatment), and was "brush" plated with nickel using a portable electroplating system manufactured by Rapid Plating Process, Inc., 2901 W. Soffel Avenue, Melrose Park, Ill. 60160-1714, which includes a power supply, copper plating solution and copper anode, and a sulfamate-based nickel plating solution with a nickel anode. The steel strip was "brush" plated at 5–7 volts using the nickel anode covered with an acrylonitrile cloth saturated with sulfamate-based nickel Rapid Plating Process electrolyte (so called "nickel coatalite") for approximately 15 minutes, to produce a matte coating of nickel with a somewhat nodular-dendritic surface, as shown in FIG. 13. Subsequently, silicon metal powder with a nominal particle size of 1–5 microns (Atlantic Equipment Engineers, 13 Foster Street, Bergenfield, N.J. 07621, Catalog No. S9–100F, 99+% pure) was placed in the nickel sulfamate plating solution between the acrylonitrile cloth-sleeve "brush" plating tool (or applicator) and the nickel plated hot rolled steel strip. A couple of drops of methanol were applied to the silicon metal powder to assist its dispersion in the nickel plating solution. A plating potential of approximately 5–7 volts was applied between the acrylonitrile cloth-covered nickel "brush" anode and the previously nickel-plated hot rolled steel reinforcement through the nickel plating electrolyte, for approximately two minutes. The silicon powder was co-deposited with additional sulfamate-based nickel electrodeposition, primarily in the zones between the woven acrylonitrile fibers, leaving an adherent "checker board" pattern which is darker than the underlying nickel deposit. The nickel-silicon-powder composite electrodeposit on the steel strip as shown in FIG. 12.

A steel wire, which had been cleaned and washed with tap water, was electroplated with a thin copper strike underlayer by connecting it to the Cathode voltage terminal of the Rapid Plating System power supply, and pulling the wire across the RTP copper "brush" anode covered with an acrylonitrile woven fabric sleeve saturated in copper electroplating electrolyte (so called "copper coatalite"). The plating potential was approximately 5–6 volts, and the plating time was approximately 10 seconds. The steel wire, which had a slight reddish color because of the thin copper strike, was then washed in water to remove the copper plating electrolyte, and was subsequently "brush" plated by pulling it across the nickel "brush" anode covered with an acrylonitrile fabric sleeve saturated in the Rapid Plating System sulfamate-based nickel plating electrolyte. The total nickel plating time was approximately 30 seconds, at an applied voltage of 5–7 volts, which produced a thin matte nickel coating on the steel reinforcing wire, as shown in FIG. 13. Subsequently, silicon metal powder with a particle size of 1–5 microns as previously described was placed on the acrylonitrile cloth-sleeve brush plating pool, and the matte nickel plated wire was connected to the cathode power supply and electroplated in the silicon-powder-containing nickel electrolyte, against the brush nickel electrode, to electroplate a co-deposit of nickel and silicon powder composite on the wire surface. The nickel and silicon powder composite electrodeposit on the steel wire is shown in FIG. 12.

The steel reinforcing step and the steel reinforcing wire may be incorporated in a concrete matrix as corrosion-resistant concrete reinforcements. The silicon powder embedded in the nickel will slowly react in the high pH environment of the cement paste, to form a dense, adherent calcium silicate hydrate interconnecting the cured concrete and the steel reinforcement.

Similarly, powdered blast furnace slag, such as previously described, can be electrodeposited with nickel or another protective metal to form a protective, cement-paste-reactive surface deposit. For example, a low, stress nickel-sulfamate-plated high ductility steel rebar (which may preferably have a 0.5–5 micron base copper strike coating) having a 5–50 micron nickel (or iron-nickel, copper-nickel, etc.) nonporous electrodeposit, may have a 50 micron thick composite layer of ground blast furnace slag electrolessly deposited on its surface from a suspension of the powdered slag in an electroless nickel deposition solution. The composite may desirably comprise from 24 percent by weight blast furnace slag, and 98–60 percent co-deposited metal.

In another example, a "clear" (General Electric) commercial silicone resin pre-polymer based on polydimethylsiloxane oligomers and containing fume silica as a reinforcing agent, was mixed with approximately 25 percent by weight of silicon powder having a nominal particle size of 1–5 microns. The silicon resin consisted of methoxypolydimethysiloxane: 68047-58-1, polydimethylsiloxane: 63148-62-9, tetramer treated fumed silica: 68583-49-3, hexamethyldisilazane: 999-97-3, Methyltrimethoxysilane: 1185-55-3, VOC (excluding water and exempt compounds) is less than 50 g/L.

A hot-rolled steel strip (as previously described) was cleaned of surface oxide, and a thin layer of the silicon-silicone resin mixture was applied to the surface of the steel reinforcing strip, to provide a corrosion-protective, brown-colored coating, as shown in Figure X. The silicon—silicon mixture was cured in air on the surface of the steel reinforcing strip for over 24 hours, to polymerized across like the silicone resin, to produce an adherent, silicone-silicon composite coating on the surface of the steel reinforcement strip. Upon placement in a high-pH cement paste, the silicone resin will slowly hydrolyze in the high pH-calcium ion rich environment, and the silicon particles will slowly react to form calcium silicate, to produce a relatively impervious protective layer around the steel reinforcement. Upon reacting, the silicon particles which are in electrical contact with the steel, can generate a protective electropotential. Mechanical stress or cracks can renew surface access to the reactive silicon particles, thereby creating a self-healing capability.

While the present invention has been described with respect to particular embodiments of apparatus and methods, it will be appreciated that various modifications and adaptations may be made based on the present disclosure and are intended to be within the scope of the accompanying claims.

What is claimed is:

1. A steel reinforcement for concrete which has corrosion resistance and the capability of forming an adherent bond with a cement matrix, comprising a steel reinforcement substrate, a corrosion-passivated metallic layer adherently bonded to said steel reinforcement substrate, and an adherent, cementitiously reactive layer adherently bonded to said corrosion-passivated metallic layer, said cementitiously reactive layer being reactive with aqueous hydraulic cement to bond therewith as the aqueous hydraulic cement cures, to form a relatively dense non-porous bond layer suitable for limiting chloride ion diffusion toward said steel reinforcement substrate.

2. A steel reinforcement in accordance with claim 1 wherein the reactive layer is calcium aluminate, calcium phosphate/apatite, or calcium silicate which can react with hydraulic cement.

3. A steel reinforcement in accordance with claim 1 wherein the corrosion passivated metallic layer comprises boron, silicon, chromium, titanium, nickel and/or their lower oxides.

4. A steel reinforcement in accordance with claim 1 wherein said corrosion passivated metallic layer is alloyed with or diffused in the steel reinforcement surface, and interposed and bonded between the steel and the adherent, cementitiously reactive layer.

* * * * *